United States Patent Office 2,967,246
Patented Jan. 3, 1961

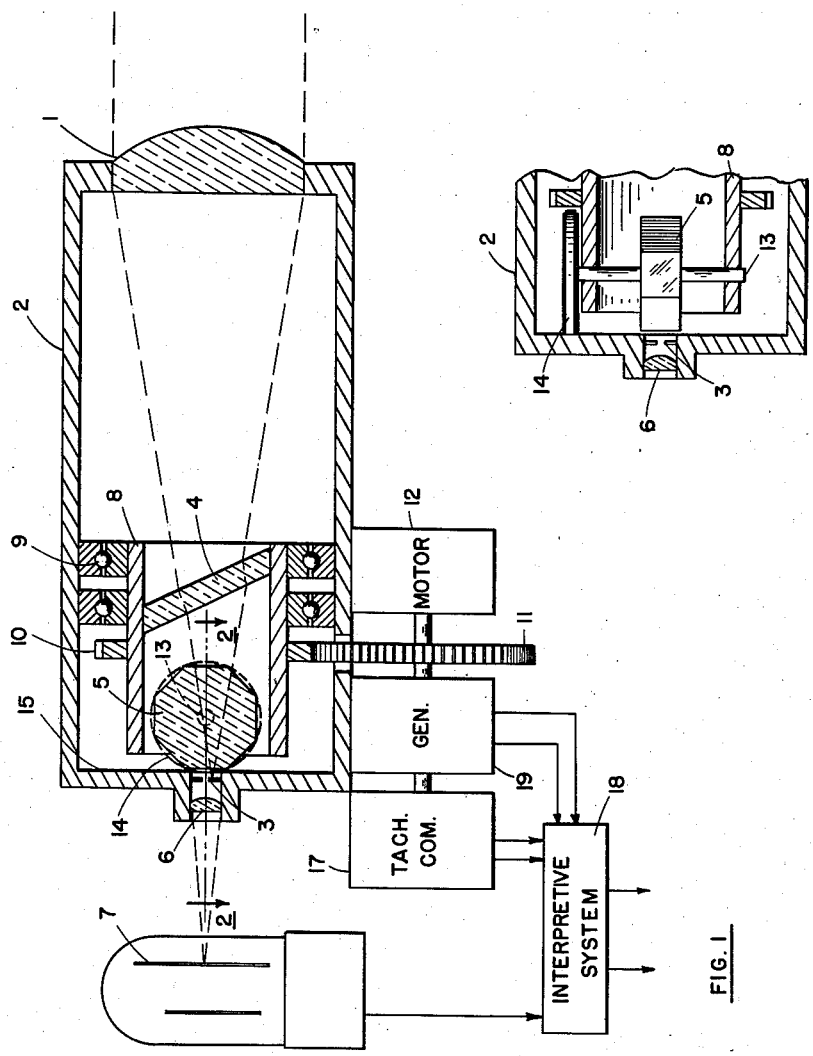

2,967,246
MOVING FIELD SCANNER
Ralph H. Ostergren, Fullerton, Calif., assignor to North American Aviation, Inc.
Filed Feb. 18, 1952, Ser. No. 272,073
8 Claims. (Cl. 250—203)

This invention pertains to scanning systems, and particularly to a device for measurnig the magnitude and direction of the deviation of a line of sight to a source of radiant energy from an optical axis in space.

In patent application Serial No. 272,074 filed February 18, 1952 in the name of Ralph H. Ostergren, for "Stationary Field Scanning System," there is disclosed a scanning system incorporating a pair of rotating opaque discs having perforations adapted by their motion to scan the field of a telescope and determine the position within the field of a star or other source of radiant energy. This invention contemplates a device for performing an equivalent scanning operation by causing the field to scan over a fixed aperture so that the relative motion of the field and the aperture results in successive radial scans of the field in which a source of radiant energy is located. The particular advantage realized by moving the field rather than the aperture is that the aperture may be made small with the result that the exit pupil or final lens of the device is small allowing the concentration of the light from a radiant source upon a very small area of the radiant energy sensing means. Many of the radiant energy sensitive devices capable of use in connection with this invention vary in sensitivity over their sensitive area. For instance, a photomultiplier tube has grid wires and it is desirable to be able to focus the emergent image from the light gathering part of the invention between these grid wires. If the device is used to detect an infrared source, the infrared sensitive cell may have highly sensitive spots surrounded by less sensitive areas. It is therefore desirable to focus the radiant energy only on one such sensitive spot.

It is therefore an object of this invention to provide an improved means for scanning an optical field.

It is another object of this invention to provide means for measuring the direction of deviation of a line of sight to a source of radiant energy from an axis in space.

It is another object of this invention to provide means for measuring the magnitude of deviation of a line of sight to a source of radiant energy from an axis in space.

It is another object of this invention to provide a scanning device in which the scanning device is held stationary while the field is caused to move over the scanning aperture.

Other objects of invention will become apparent from the following description taken in connection with the accompanying drawings, in which Fig. 1 is a schematic drawing of the invention;

And Fig. 2 is a sectional view of the device taken at 2—2 in Fig. 1.

Referring to Fig. 1, there is shown an objective lens 1, held rigidly by tubular member 2, for gathering light from a star or other source of radiant energy and casting it upon an aperture plate 3 held in the end of tube 2. Plane parallel glass plate 4 is held at a skewed angle in tubular member 8 which is caused to rotate in bearings 9 by rotation of gear 10. Gear 10, in turn, is driven by gear 11 shaft-connected to motor 12. Tubular member 8 also encloses octagonal prism 5 which is rotatably supported in the tubular member by pins 13 integrally attached to the prism and driven by elastomer covered wheel 14 which bears upon end member 15 of tube 2. Light passing through aperture plate 3 is focused by lens 6 upon a photomultiplier tube 7. It is to be borne in mind that lens 6, in effect, produces an image of objective lens 1 on tube 7. This image is small so that only a very small area of the photomultiplier tube or other radiation sensitive means is affected by the gathered radiant energy. Motor 12 also drives a tachometer commutator 17 having an output frequency equal to the rotative frequency of tubular member 8. Motor 12 also drives pulse generator 19 whose output consists of sharp pulses at a frequency eight times the rotative frequency of prism 5. These outputs are fed with the output of photomultiplier tube 7 to interpretive system 18.

In operation, this device is used to determine the direction and magnitude of misorientation of the axis of the system from the line of sight to a star or other source of radiant energy. Motor 12 is driven at constant speed so that because of the angle of skew of plate 4 the beam emergent therefrom is caused to rotate in a circular path. However, prism 5 is caused to rotate about an axis normal to the axis of lens 1, and due to the optical properties of prism 5 the light emergent from the prism scans over or traverses aperture plate 3 each time a new face of the prism is presented to the light emergent from plate 4. The result is that a series of radial scans of the field is accomplished and the light falling upon the photomultiplier tube is only that light which passes through the skewed plate, the rotating prism, and the fixed aperture plate. The light presented to the aperture in aperture plate 3 is therefore representative of a small spot somewhere in the field of the optical system represented by lens 1. This spot is, in effect, caused to traverse the field in a series of radial swaths, or paths, beginning at the center of the field and proceeding outwardly to the edge of the field each time a new face of the prism is presented to the incoming beam. The scan begins each time at the center of the field because of the presence of plate 4, the angle of skew of which is adjusted to achieve this result. Each time the spot crosses a source of radiant energy, radiant energy is transmitted to the photomultiplier tube and causes an output signal therefrom. Interpretive ssytem 18, similar in all respects to that shown and described in patent applicant Serial No. 272,074 for "Stationary Field Scanning System" above referred to, compares the phase of the output of tachometer commutator 17 and photomultiplier tube 7, and thus measures the direction in which the source of radiant energy is displaced from the axis of the telescope. Interpretive system 18 also receives pulses from pulse generator 19, which pulses index the start of each scan. Interpretive system 18 thus also measures the magnitude of the angular deviation of the line of sight to the source of radiant energy from the axis of the optical system by measuring the time within each individual scan at which the source of radiant energy is encountered in the same manner as described in connection with the patent application for "Stationary Field Scanning System" referred to above.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for measuring the direction of deviation of the line of sight to a celestial body from an optical axis in space comprising photoelectric means for producing signals in response to light transmitted to it, an optical system for gathering light from said body and casting it upon said photoelectric means, and means predeterminately interposed in said optical system for causing the field of said optical system to scan a point on said photoelectric means in repetitive paths which are on radii of said field whereby the phase of output of said photoelectric means is a measure of the direction of deviation of the line of sight to said body from the optical axis of said system.

2. Means for measuring the direction of deviation of the line of sight to a radiant energy source from an optical axis, comprising a fixed opaque plate having an aperture therein, first optical means for gathering light from said radiant energy source and casting it upon said aperture, means for producing an electrical signal in response to radiant energy, second optical means for producing an image on said radiant energy responsive means from light transmitted by said aperture, and means for causing the light gathered by said first optical means to traverse said aperture in circumferentially successive radial paths whereby the direction of the path when said radiant energy responsive means produces an electrical signal is the direction of deviation of the line of sight to said radiant energy source from the optical axis of said optical means.

3. A device as recited in claim 2 and further comprising generator means for producing an electrical signal in phase with said traversing means, and means for phase comparing the output of said generating means with the output of said radiant energy responsive means to thereby measure said direction of angular deviation.

4. A device as recited in claim 2 in which said traversing means comprises a plane parallel transparent plate skewed with respect to the optical axis of said first optical means and rotated about said axis, and an octagonal prism rotated on an axis normal to and rotated in synchronism with said plate on said optical axis.

5. A device as recited in claim 2 in which said traversing means comprises a plane parallel transparent plate in a plane intersecting and predeterminately inclined with respect to said optical axis, and an octagonal prism spun on an axis normal to said optical axis and rotated about said optical axis in synchronism with said plate.

6. Means for measuring the direction of deviation of a line of sight to a source of radiant energy from the optical axis of an optical system, comprising radiant energy responsive means for producing electrical signals in response to variations in radiant energy supplied thereto, a fixed aperture plate having a single aperture for limiting the radiant energy transmitted to said radiant energy responsive means, and optical means for gathering radiant energy from a field of view including said source of radiant energy, said gathering means scanning said field in circumferentially consecutive separate radial paths whereby the phase of the output of said radiant energy responsive means relative to the phase of said gathering means is a measure of the direction of deviation of a line of sight to said radiant energy source from the optical axis of said gathering means.

7. In an apparatus for locating a radiant energy source including a photoelectric cell, means for presenting to said photoelectric cell radiant energy from a moving point in a field including said source, which point traverses said field in circumferentially successive radial paths.

8. Means for scanning an optical field with a circumferentially successive plurality of radial paths comprising means for gathering light from said field into a beam, means for causing said beam to rotate in a circular pattern, means for causing said beam to oscillate radially with respect to said rotating means, and a fixed aperture for receiving a restricted amount of light from said beam to thereby scan said field with a plurality of circumferentially successive radial paths.

References Cited in the file of this patent

UNITED STATES PATENTS 2,462,925     Varian     Mar. 1, 1949